(12) United States Patent
Bessette et al.

(10) Patent No.: US 12,503,680 B2
(45) Date of Patent: Dec. 23, 2025

(54) METHODS AND SYSTEMS FOR CELL BED FORMATION DURING BIOPROCESSING

(71) Applicant: NantKwest, Inc., San Diego, CA (US)

(72) Inventors: Shannyn Bessette, San Diego, CA (US); Diemchi Nguyen, San Diego, CA (US)

(73) Assignee: ImmunityBio, Inc., San Diego, CA (US)

( * ) Notice: Subject to any disclaimer, the term of this patent is extended or adjusted under 35 U.S.C. 154(b) by 883 days.

(21) Appl. No.: 17/057,239

(22) PCT Filed: May 21, 2019

(86) PCT No.: PCT/US2019/033256
§ 371 (c)(1),
(2) Date: Nov. 20, 2020

(87) PCT Pub. No.: WO2019/226618
PCT Pub. Date: Nov. 28, 2019

(65) Prior Publication Data
US 2021/0163868 A1 Jun. 3, 2021

Related U.S. Application Data

(60) Provisional application No. 62/674,747, filed on May 22, 2018.

(51) Int. Cl.
*C12M 1/12* (2006.01)
*C12M 1/00* (2006.01)
(Continued)

(52) U.S. Cl.
CPC ............ *C12M 25/20* (2013.01); *C12M 23/14* (2013.01); *C12M 27/10* (2013.01); *C12M 29/14* (2013.01);
(Continued)

(58) Field of Classification Search
None
See application file for complete search history.

(56) References Cited

U.S. PATENT DOCUMENTS 4,829,002 A * 5/1989 Pattillo ................. C12M 23/14
435/297.1
4,978,616 A 12/1990 Dean, Jr.
(Continued)

FOREIGN PATENT DOCUMENTS

CN 103966092 A * 8/2014 ............ C12M 21/08
WO 2013/109520 A1 7/2013

OTHER PUBLICATIONS

D. Bowdish, "Maintenance & Culture of THP-1 Cells", Bowdish Lab, McMaster University, 2011 (Year: 2011).*
(Continued)

*Primary Examiner* — Henry H Nguyen
(74) *Attorney, Agent, or Firm* — Kilpatrick Townsend & Stockton LLP

(57) ABSTRACT

Methods and systems are disclosed for manipulating inert materials and biomaterials, including cell cultures, to efficiently form effective cell beds while preventing excess flow through of cells to permeate waste during bioprocessing. Gentle centrifugation concentrates a large volume of cells produced from bioreactors into the desired concentrated volume and cell density. When cells pass through the centrifuge, the majority fraction of cells are retained in the centrifuge disposable chamber pods as a cell bed. A recirculation loop redirects the remaining minority fraction of cells back to the cell bag instead of proceeding to waste. This prevents initial cell loss during cell bed formation in the chamber pods, increases overall cell yields at harvest, and conserves materials, for example. Growing and harvesting
(Continued)

natural killer cells, in particular, increased yields by over 30% when the recirculation loop was employed.

6 Claims, 10 Drawing Sheets

(51) Int. Cl.
  *C12M 1/26* (2006.01)
  *C12M 1/34* (2006.01)
  *C12M 3/04* (2006.01)
  *C12N 5/0783* (2010.01)
(52) U.S. Cl.
  CPC ............ *C12M 29/18* (2013.01); *C12M 33/10* (2013.01); *C12M 41/36* (2013.01); *C12M 47/02* (2013.01); *C12N 5/0646* (2013.01)

(56) References Cited

U.S. PATENT DOCUMENTS

| | | | | |
|---|---|---|---|---|
| 5,510,247 A * | 4/1996 | Komives | ................ | C12M 33/10 435/813 |
| 5,622,819 A | 4/1997 | Herman | | |
| 2006/0019385 A1 * | 1/2006 | Smith | ................... | C12M 29/16 435/348 |
| 2006/0257998 A1 * | 11/2006 | Klaus | .................... | C12M 23/04 417/212 |
| 2011/0207225 A1 * | 8/2011 | Mehta | .................... | C12N 13/00 435/173.6 |
| 2012/0100576 A1 * | 4/2012 | Goletz | ................... | C12M 23/14 435/383 |
| 2014/0099711 A1 * | 4/2014 | Shimoni | ................ | C12M 47/10 435/325 |
| 2015/0299644 A1 * | 10/2015 | Tijsterman | ............. | C12M 23/58 435/69.6 |
| 2016/0348061 A1 * | 12/2016 | Diel | ....................... | C12M 37/02 |
| 2017/0121673 A1 * | 5/2017 | Wolpe | .................. | A01N 1/0284 |
| 2017/0292104 A1 * | 10/2017 | Ebrahimi Warkiani | ..................... | C12M 47/02 |
| 2017/0333815 A1 * | 11/2017 | Kompala | ............. | C12N 5/0636 |
| 2018/0142199 A1 * | 5/2018 | Jones | ..................... | C12M 21/08 |

OTHER PUBLICATIONS

Translation of CN 103966092 A, Ou, Dong-bo, Aug. 6, 2014 (Year: 2014).*

International Search Report and Written Opinion, from PCT/US2019/033256, dated Sep. 11, 2019, 14 pages.

* cited by examiner

| Expt. # | Cell Line | Harvest Vol. (mL) | Total Cells Pre-Harvest | Cell Viability Pre-harvest (%) | Total Cells Recovered | Cell Viability Post-harvest (%) | Process Recovery (%) |
|---|---|---|---|---|---|---|---|
| 1 | aNK | 10050 | 1.55E+10 | 96.0 | 1.25E+10 | 96.1 | 81.0% |
| 2 | aNK | 9960 | 1.21E+10 | 94.2 | 3.76E+09 | 95.4 | 31.2% |
| 3 | aNK | 9800 | 8.71E+09 | 96.8 | 6.74E+09 | 97.7 | 77.4% |
| 4 | aNK | 9930 | 1.06E+10 | 98.2 | 6.07E+09 | 93.8 | 57.3% |
| 5 | aNK | 9900 | 9.17E+09 | 98.2 | 5.00E+09 | 95.5 | 54.6% |
| 6 | aNK | 25280 | 3.28E+10 | 92.2 | 1.53E+10 | 96.4 | 46.8% |
| 7 | haNK | 10200 | 8.68E+09 | 98.1 | 4.99E+09 | 96.3 | 57.5% |
| 8 | haNK | 10200 | 1.05E+10 | 96.2 | 1.09E+09 | 71.1 | 10.4% |
| 9 | haNK | 10200 | 1.18E+10 | 97.7 | 3.52E+09 | 95.8 | 29.8% |
| 10 | haNK | 24760 | 3.24E+10 | 96.1 | 3.17E+10 | 95.6 | 97.7% |
| 11 | haNK | 10040 | 9.48E+09 | 95.5 | 8.51E+09 | 96.8 | 89.8% |

FIG. 8

| Expt. # | Cell line | Harvest Vol. (mL) | Total Cells Pre-Harvest | Cell Viability Pre-harvest (%) | Total Cells Recovered | Cell Viability Post-harvest (%) | Process Recovery (%) |
|---|---|---|---|---|---|---|---|
| 12 | haNK | 24840 | 1.90E+10 | 91.6 | 1.59E+10 | 90.8 | 83.4% |
| 13 | aNK | 10100 | 9.06E+09 | 98.3 | 5.89E+09 | 97.0 | 65.0% |
| 14 | haNK | 10340 | 1.17E+10 | 94.0 | 9.36E+09 | 95.8 | 80.1% |
| 15 | aNK | 9630 | 1.16E+10 | 95.3 | 1.20E+10 | 93.5 | 103.1% |
| 16 | aNK | 25230 | 3.71E+10 | 93.5 | 2.17E+10 | 92.3 | 58.5% |
| 17 | aNK | 10050 | 1.12E+10 | 96.4 | 1.04E+10 | 97.8 | 93.2% |
| 18 | HER2.taNK | 10010 | 1.29E+10 | 95.2 | 1.16E+10 | 96.1 | 89.7% |
| 19 | HER2.taNK | 10000 | 1.24E+10 | 95.7 | 1.00E+10 | 96.1 | 80.7% |
| 20 | HER2.taNK | 25210 | 2.71E+10 | 97.6 | 2.48E+10 | 95.6 | 91.6% |
| 21 | haNK | 20000 | 2.20E+10 | 98.4 | 1.97E+10 | 96.1 | 89.5% |
| 22 | haNK | 29900 | 2.99E+10 | 98.8 | 2.37E+10 | 98.3 | 79.3% |
| 23 | haNK | 26000 | 2.73E+10 | 98.0 | 2.49E+10 | 96.7 | 91.2% |
| 24 | haNK | 27000 | 2.64E+10 | 97.7 | 2.15E+10 | 96.5 | 81.4% |
| 25 | haNK | 53200 | 5.89E+10 | 97.8 | 5.71E+10 | 97.4 | 96.9% |
| 26 | haNK | 36660 | 4.12E+10 | 96.3 | 3.55E+10 | 95.5 | 86.2% |
| 27 | haNK | 42650 | 5.03E+10 | 97.6 | 4.32E+10 | 95.1 | 85.9% |
| 28 | haNK | 32500 | 3.33E+10 | 98.6 | 3.14E+10 | 96.7 | 94.3% |
| 29 | haNK | 28640 | 3.02E+10 | 98.6 | 2.74E+10 | 93.7 | 90.7% |
| 30 | haNK | 41400 | 4.08E+10 | 98.6 | 3.77E+10 | 97.3 | 92.4% |
| 31 | haNK | 11310 | 1.29E+10 | 97.9 | 1.18E+10 | 96.6 | 91.5% |
| 32 | haNK | 16230 | 1.72E+10 | 97.2 | 1.39E+10 | 93.0 | 80.8% |
| 33 | haNK | 33980 | 3.32E+10 | 95.4 | 2.78E+10 | 94.6 | 83.7% |
| 34 | haNK | 38700 | 3.82E+10 | 94.5 | 3.13E+10 | 94.8 | 81.9% |
| 35 | haNK | 36220 | 4.09E+10 | 95.9 | 4.03E+10 | 96.4 | 98.5% |
| 36 | haNK | 39860 | 3.67E+10 | 93.5 | 3.65E+10 | 93.5 | 99.5% |
| 37 | haNK | 37040 | 3.78E+10 | 95.4 | 3.88E+10 | 96.1 | 102.6% |
| 38 | haNK | 41980 | 3.81E+10 | 91.7 | 3.98E+10 | 95.3 | 104.5% |
| 39 | haNK | 45220 | 4.14E+10 | 92.7 | 2.79E+10 | 95.7 | 67.4% |
| 40 | haNK | 10110 | 1.00E+10 | 95.1 | 6.85E+09 | 96.5 | 68.5% |
| 41 | haNK | 50000 | 5.45E+10 | 92.8 | 4.68E+10 | 95.4 | 85.9% |
| 42 | haNK | 24100 | 2.77E+10 | 97.5 | 2.62E+10 | 97.0 | 94.5% |

FIG. 9

| Expt. # | Cell line | Harvest Vol. (mL) | Total Cells Pre-Harvest | Cell Viability Pre-harvest (%) | Total Cells Recovered | Cell Viability Post-harvest (%) | Process Recovery (%) |
|---|---|---|---|---|---|---|---|
| 43 | haNK | 46200 | 5.73E+10 | 97.3 | 5.55E+10 | 97.6 | 96.8% |
| 44 | haNK | 40000 | 3.98E+10 | 97.2 | 3.19E+10 | 97.3 | 80.1% |
| 45 | haNK | 32200 | 2.83E+10 | 96.6 | 1.66E+10 | 95.5 | 58.6% |
| 46 | haNK | 34600 | 2.84E+10 | 90.1 | 2.06E+10 | 86.7 | 72.8% |
| 47 | haNK | 10500 | 1.18E+10 | 93.9 | 8.93E+09 | 94.3 | 76.0% |
| 48 | haNK | 9640 | 1.11E+10 | 94.4 | 9.60E+09 | 96.0 | 86.6% |
| 49 | haNK | 19450 | 2.26E+10 | 94.9 | 1.94E+10 | 96.1 | 85.9% |
| 50 | haNK | 19850 | 1.89E+10 | 94.7 | 1.54E+10 | 94.1 | 81.5% |
| 51 | haNK | 44200 | 5.61E+10 | 98.1 | 5.61E+10 | 97.3 | 100.0% |
| 52 | haNK | 43000 | 5.29E+10 | 97.3 | 4.63E+10 | 96.5 | 87.5% |
| 53 | haNK | 35000 | 3.96E+10 | 97.7 | 4.05E+10 | 97.4 | 102.4% |
| 54 | haNK | 30300 | 3.61E+10 | 96.3 | 3.76E+10 | 97.3 | 104.1% |
| 55 | haNK | 29700 | 3.68E+10 | 96.3 | 3.26E+10 | 96.8 | 88.6% |
| 56 | haNK | 21700 | 2.56E+10 | 98.3 | 2.62E+10 | 95.7 | 102.3% |
| 57 | haNK | 44400 | 5.28E+10 | 97.4 | 5.41E+10 | 97.9 | 102.3% |
| 58 | haNK | 16400 | 2.00E+10 | 97.4 | 1.18E+10 | 96.1 | 58.9% |
| 59 | haNK | 11100 | 1.35E+10 | 97.4 | 1.17E+10 | 96.2 | 86.6% |
| 60 | haNK | 44900 | 5.93E+10 | 97.3 | 5.42E+10 | 96.1 | 91.5% |
| 61 | haNK | 37900 | 4.59E+10 | 96.7 | 4.83E+10 | 97.1 | 105.4% |
| 62 | PD-L1 t-haNK | 10510 | 1.21E+10 | 94.5 | 1.29E+10 | 96.9 | 106.6% |
| 63 | CD19 t-haNK | 31100 | 3.67E+10 | 94.8 | 3.84E+10 | 95.9 | 104.6% |
| 64 | CD19 t-haNK | 32760 | 3.54E+10 | 92.3 | 3.37E+10 | 94.5 | 95.2% |
| 65 | CD19 t-haNK | 50710 | 5.32E+10 | 90.9 | 3.84E+10 | 95.5 | 72.2% |
| 66 | CD19 t-haNK | 40400 | 5.09E+10 | 97.4 | 4.63E+10 | 97.8 | 90.9% |
| 67 | CD19 t-haNK | 36100 | 4.40E+10 | 96.7 | 4.21E+10 | 97.8 | 95.7% |
| 68 | CD19 t-haNK | 10200 | 1.12E+10 | 95.9 | 1.05E+10 | 95.2 | 93.4% |
| 69 | CD19 t-haNK | 42500 | 4.68E+10 | 95.7 | 4.43E+10 | 97.4 | 94.7% |
| 70 | PD-L1 t-haNK | 24940 | 2.09E+10 | 95.9 | 1.82E+10 | 96.4 | 87.3% |
| 71 | PD-L1 t-haNK | 24890 | 2.38E+10 | 91.6 | 2.28E+10 | 94.6 | 95.4% |
| 72 | PD-L1 t-haNK | 25710 | 2.65E+10 | 89.7 | 2.73E+10 | 93.7 | 103.2% |
| 73 | PD-L1 t-haNK | 37920 | 3.98E+10 | 89.5 | 3.53E+10 | 95.8 | 88.7% |
| 74 | PD-L1 t-haNK | 36320 | 3.89E+10 | 92.3 | 3.33E+10 | 94.5 | 85.6% |
| 75 | PD-L1 t-haNK | 35670 | 3.60E+10 | 88.8 | 3.56E+10 | 92.9 | 98.8% |

FIG. 10

METHODS AND SYSTEMS FOR CELL BED FORMATION DURING BIOPROCESSING

RELATED APPLICATION

This application claims priority to U.S. Provisional Application No. 62/674,747, filed on May 22, 2018. The entire content of the provisional application is incorporated herein by reference for all purposes.

BACKGROUND OF THE INVENTION

Biotechnological products offer promising therapies for cancer and other insidious diseases. Large numbers of biomaterials, including cells, are grown and propagated in bioprocessing systems. Prokaryotic cells (e.g., bacterial cells) are physically more resilient than eukaryotic cells. Eukaryotic cells (e.g., mammalian cells) are more fragile and are more affected by steps in the culturing process such as centrifugation, pelleting or re-suspension which are necessary manipulations of the cells for bio-manufacturing purposes.

Cells are usually grown in large stainless-steel fermentation vats under strictly maintained and regulated conditions. The cells may be the product itself, or the cells may produce a product of interest. With either goal, the production of cellular based products is a complicated and sensitive process. The cells are grown in carefully controlled culture conditions which include a balance of temperature, oxygen, acidity, and removal of waste products or an excreted product of interest. The growth and activity of the cells can be changed by altering the culture conditions, and can be highly inhibited by actions such as removal of media, isolation of the cells by spinning out the cells and packing them in a pellet formed by centrifugation, and resuspension of a packed pellet to reintroduce the cells into the culture conditions.

Continuous centrifugation allows processing of large volumes of material at high centrifugal forces without having to fill and decant a large number of centrifuge tubes or frequently stop and start the roter. Thus, continuous centrifugation can reduce material process time. Continuous centrifugation systems are well known and commercially available, for example, the CF-32 Ti and JCF-Z continuous flow rotors from Beckman Coulter (Brea, CA) or Unifuge® by Pneumatic Scale Angelus (Ontario, CA). However, when using continuous centrifugal systems, a significant amount of cells accumulate in the waste during the initial formation of the cell bed. Consequently, large numbers of cells are lost to waste during the initial cell bed formation which, in turn, causes a significant decrease in overall cell yields at the end of production. Cycle optimization has been attempted by reversing flow of the continuous centrifuge pumps to allow the collected permeate to be brought back through the system aseptically into the bioreactor vessel to re-process what had been lost. However, this approach has several drawbacks including increased stress on the cells, potential risk for creating high pressure within the disposable if there is a system malfunction (pinch valve failure) and an overall increase in process time, for example.

Many known cell culture methods require significant investment in capital and labor. Cell culture facilities cost millions of dollars to build and take several years to construct. There are a limited number of existing facilities that can be used to produce the products that are currently proposed. Cell culture is currently used for production of proteins such as human insulin, vaccine proteins, enzymes for food processing, biodegradable plastics, and even laundry detergent enzymes using bioprocessing systems from Pall Corporation, Sartorius Stedim Biotech, Millipore Sigma, Scilog® Bioprocessing Systems, GE Healthcare and others. Such products may include, but are not limited to, therapeutic molecules, vaccines, and antibodies that function as diagnostic tools, therapeutic compounds, in protein-chips or biosensors.

There is also a growing emphasis to utilize green technology during bio-manufacturing. This approach examines the type and amount of resources required to make therapeutic proteins and other cell culture products, and the wastes generated by mammalian cell culture and microbial fermentation processes. For example, the processes of cell culture uses copious amounts of water in batch reactors that hold thousands of liters of culture or fermentation broth. Additionally, even more water, along with consumable processing aids, such as tubing, filters and chromatography processes, are used for downstream purification. Using disposable equipment may add to the waste stream, whereas using reusable materials adds to the water usage.

Information related to attempts to address these problems can be found in Jones S., et al., Emerging Challenges in Cell Therapy Manufacturing, *BioProcess International* (2012) 10(3):S4-S7; Pattasseri J., et al., Downstream Technology Landscape for Large Scale Therapeutic Cell Processing, *BioProcess International* (2013) 11(3):38-47 and Sinclair, A., The Environmental Impact of Disposable Technologies, *BioPharm International* (2008), and U.S. Pat. Nos. 5,510,247; 5,622,819; 6,214,617; 6,354, 986; 6,617,154; 6,942,804; 9,090,910; and 9,279,133 and United States Patent Application Publication Numbers: 2001/0044134; 2001/0044143; 2002/0031830; 2004/0017018; 2004/0048358; 2005/0266548; 2005/0287670; 2006/0188490; 2007/0095393; 2009/0075801 and 2011/0207225, for example. Various methods and systems that enhance cell bed formation, prevent cell loss and save resources, including some embodiments of the invention, can mitigate, reduce, or even prevent the effect of, or even take advantage of, some or all of these potential problems.

For the foregoing reasons, there's a legitimate need for inexpensive and efficient methods and systems that can be used in bio-manufacturing systems and other types of processes to gently form an effective cell bed such that process recovery from automated centrifugation systems after concentration is increased. What is also needed are methods and systems that do not disrupt cellular growth and activity processes during the bio-manufacturing processes, and aid in the growth and production of cells. Additionally, it would be helpful to provide green technology advances to the bio-manufacturing process. Accordingly, systems and methods that conserve solvents, buffers, water, and other materials, would be welcomed.

BRIEF SUMMARY OF THE INVENTION

The methods and systems disclosed herein include manipulating particles including inert particles and cells or biomaterials such as cellular components, proteins, carbohydrates, lipids, and tissues.

In one embodiment, a method for increasing yields of biomaterials comprises: a) rotating a chamber about a substantially horizontal axis to create a centrifugal force, the chamber having an inlet and an outlet; b) flowing a first stream containing media and biomaterials from a container into the chamber through the inlet, wherein flowing the first stream acts to create a flowing force which opposes the centrifugal force; c) forming a fluidized bed consisting of a majority fraction of biomaterials in the chamber, wherein the centrifugal force and the flowing force substantially immobilize the biomaterials in the fluidized bed by the summation of vector forces acting on the biomaterials; d) passing a minority fraction of media and biomaterials through the outlet of the chamber; e) recirculating the minority fraction back to the cell bag via a recirculation loop; and f) optionally repeating steps a) through e). Then thereafter, the method for increasing yields of biomaterials comprises: g) discharging a majority fraction of media and biomaterials from the fluidized bed, wherein discharging comprises: h) flowing a second stream into the chamber through the outlet, wherein flowing the second stream acts to create a second flowing force at least partially in the same direction as the centrifugal force, and i) collecting the biomaterials passing through the inlet of the chamber.

The container may be a cell culture system or bioreactor. The biomaterials are cells, cellular organelles; nanoparticles, micro-particles, or cellular products. The cells may be NK cells, aNK cells, haNK® cells, t-haNK® cells or variants thereof. The cells are genetically engineered cells or modified cells. The cells are configured to treat various types of cancers including, but not limited to, leukemias, lymphomas, myelomas, sarcomas, carcinomas, gliomas, astrocytomas, blastomas, giomas, ependymomas, pinealomas, acoustic neuromas, and melanomas, for example. Additionally, the cells may be configured to treat infectious diseases, inflammatory diseases, or any combination thereof. The media is a buffer solution or a wash solution. The recirculating step increases a collection yield of the biomaterials passing though the inlet of the chamber by 25% to 32%. Recirculating increases the collection yield of the biomaterials passing though the inlet of the chamber by about 30%. About 86% of the biomaterials passing though the inlet of the chamber are collected.

In another embodiment, a method for enhancing fluidized biomaterial bed formation comprises providing a bioprocessing system. The system has a waste line, a cell bag and a bioreactor fluidly connected together. A recirculation loop is attached from the waste line back to the cell bag. The recirculation loop has a sterile tube attached to a valve. A media and a biomaterial are provided to the system. The system is activated such that during at least an initial process, the media and biomaterials return to the cell bag from the continuous centrifuge when the valve is in a first position. A minority fraction of the media and the biomaterial is removed to the waste line when the valve is in a second position. A majority fraction of the biomaterial harvested from the bioreactors is then collected into a harvest vessel.

The bioprocessing system is a continuous centrifuge system. About 86% of the majority fraction of biomaterial is collected from the bioreactor into the harvest vessel. The method for enhancing fluidized biomaterial bed formation further comprises disposing a sterile septum port along the circulation loop. The port is configured to allow a permeate to be sampled and monitored for biomaterial flow through titers. The minority fraction of media and biomaterial is removed to the waste line when the titers indicate a biomaterial density in the recirculation loop less than about $1 \times 10^5$ cells/mL. The biomaterial may be cells, cellular organelles, nanoparticles, micro-particles, or cellular products. The cellular products are antibodies or antigens and the cells are NK cells, aNK cells, haNK® cells, taNK® cells or t-haNK® cells or variants thereof.

In yet another embodiment, a system to enhance fluidized bed formation and increase production yields during bioprocessing comprises a chamber on a rotor that is rotatable about a substantially horizontal axis, in a plane substantially coaxial with the gravitational force axis, to create a centrifugal force. The chamber comprising an inlet and an outlet. A container contains a first media and particles and the container is spaced apart from the rotor. At least one pump is in fluid communication with the rotating chamber and the container. A manifold is in fluid communication with the rotating chamber. The manifold includes a plurality of spaced apart valves that are selectively closed and opened during use. A controller is in communication with the at least one pump and the valves. The controller directs: (i) the valves to open and close, (ii) the flow rates of the at least one pump, (iii) the rotational speed of the rotor, and (iv) a flow velocity of a first stream containing the first media and particles from the container into the chamber through the inlet. A recirculation tube has one end fluidly connected to the cell bag and an opposite end fluidly connected to a waste line. The recirculation tube has a loop valve disposed therein. During operation, the flow velocity of the first stream from the container into the chamber through the inlet acts to create a force which opposes the centrifugal force, thereby forming a fluidized bed of particles in the chamber. The forces substantially immobilize the particles in the fluidized bed by the summation of vector forces acting on the particles. The loop valve in a first position directs a minority fraction of the media and the particles from the chamber to the cell bag via the recirculation tube and back to the chamber. The controller further directs a flow velocity of a second stream containing a second media into the chamber through the outlet. During operation, the flow velocity of the second stream into the chamber through the outlet acts to create a force at least partially in the same direction as the centrifugal force field and the loop valve in a second position bypasses the recirculation loop to remove a minority fraction of the media to the waste line and a majority fraction of the particles from the fluidized bed to a final harvest vessel.

The first media is a growth media and the second media is a wash buffer. The particles are biomaterials or inert materials. The biomaterials are cells, cellular organelles, nanoparticles, micro-particles, or cellular products and the cells are NK cells, aNK cells, haNK® cells, t-haNK® cells or variants thereof. The container is a cell culture system or bioreactor.

[The system to enhance fluidized bed formation and increase production yields during bioprocessing, further comprises a sterile septum port disposed along the circulation tube, the port configured to allow contents to be sampled and monitored for particle flow through concentrations. The minority fraction of cells are moved to the waste line when the concentration indicates a cell density in the recirculation tube of less than about $1 \times 10^5$ cells/mL.

These and other features, aspects, and advantages of various embodiments of the invention will become better understood with regard to the following description, appended claims and accompanying drawings and abstract.

BRIEF DESCRIPTION OF THE DRAWINGS

FIG. 8 is a table of data showing cell culture parameters at harvest after centrifugation without using a recirculation loop according to embodiments of the present invention. The arrow indicates experiment Where permeate was pumped back through centrifuge for re-processing FIGS. 9 and 10 are tables of data showing cell culture parameters at harvest after centrifugation including the use of a recirculation loop according to embodiments of the present invention. The arrow indicates process Where recirculation loop was introduced regularly to process configuration.

DETAILED DESCRIPTION OF THE INVENTION

Figure 1:
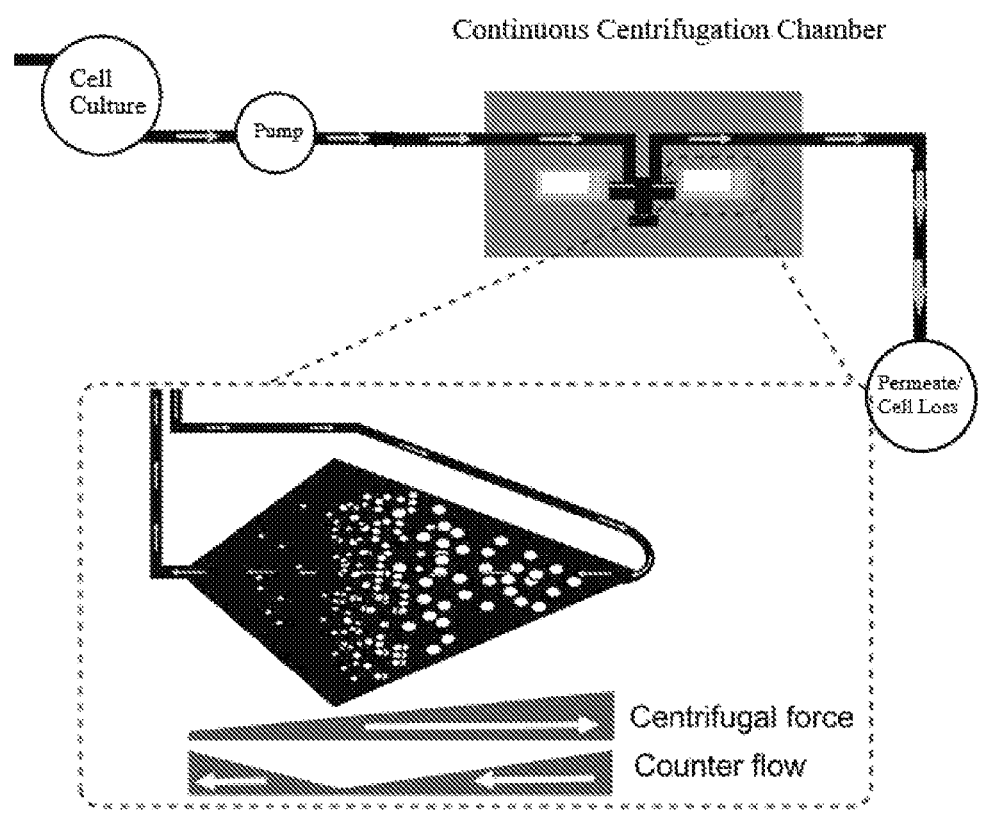
FIG. 1 (Prior Art) is an exemplary automated centrifugation system, which illustrates fluid force dynamics during centrifugation.

The present invention is now delineated more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below". "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

As used herein, the term "particles" includes inert and living materials, and includes, but is riot limited to cells, cellular organelles, enzymes, biomolecules such as proteins, lipids, carbohydrates, inert materials such as polymeric or copolymeric materials that are nano or microparticles and other types of nano or microparticles.

As used herein, the term "cell culture system" refers to any system or apparatus in which cells are grown, including, without limitation, mammalian, avian, insect, fungal, and bacterial cells. In one embodiment, a cell culture system refers to a system in which cells are grown in suspension.

As used herein, the term "fluid" includes liquids and gases and the term "biomaterials" refers to materials that are part of a cell or other living structure, e.g., proteins, peptides, nucleic acids, lipids, carbohydrates, membranes, organelles, etc.

As used herein, the term "physically modifying" refers to the physical alteration of cell(s). For example, a change in physical and/or chemical structure, covalent binding to another molecule, incorporation of a molecule, etc.

As used herein, the term "altering the environment" refers to a change in the milieu surrounding the particle, e.g., a change in media, addition of one or more compounds to the media, a change in the concentration of a compound within the media, etc.

The methods and systems disclosed herein comprise methods and systems for the manipulation of particles, such as inert particles or living particles, such as cells in cell culture, using a fluidized bed. Useful applications of the methods and systems include, but are not limited to, movement of particles (e.g., cells, either prokaryotic or eukaryotic) from one location to another, concentrating or diluting of particles (e.g., cells), such as increasing or decreasing the number of cells/ mL, changing of media conditions, performing actions on the particles (e.g., cells) or changing the environment of the particles (e.g., cells), such as transfecting the cells or providing specific chemical activators or inhibitors to the cells, and providing a controlled measured dispensing of particles or cells into other vessels, such as into vials or other containers.

If a method or system is disclosed and discussed and a number of modifications that can be made to the method or system are discussed, each and every combination and permutation of the method or system, and the modifications that are possible, are specifically contemplated unless specifically indicated to the contrary. Likewise, any subset or combination of these is also specifically contemplated and disclosed. This concept applies to all aspects of this disclosure including, but not limited to, steps in methods using the disclosed system. Thus, if there are a variety of additional steps that can be performed, it is understood that each of these additional steps can be performed with any specific method steps or combination of method steps of the disclosed methods, and that each such combination or subset of combinations is specifically contemplated and should be considered fully disclosed.

The methods and systems of the present invention may comprise an apparatus comprising a rotor that rotates in a plane substantially coaxial with the gravitational axis. The apparatus may be outfitted with components to allow for the flow of liquid media. The methods and apparatus substantially immobilizes the particles that form a fluidized bed by use of the summation of the vector forces acting on each particle. Embodiments of such apparatus have been disclosed in U.S. Pat. Nos. 5,622,819; 5,821,116; 6,133,019; 6,214,617; 6,660,509; 6,703,217; 6,916,652; 6,942,804; 7,347,943; and 9,090,910; and 9,279,133, each of which is incorporated by reference in its entirety.

Natural killer cells, also known as NK cells, or killer cells, are a type of lymphocyte and a component of innate immune systems. These cells play a major role in the host-rejection of both tumors and virally infected cells. Natural killer cells are cytotoxic. They have small granules in their cytoplasm that contain special proteins such as perforin and proteases known as granzymes. Upon release in close proximity to a cell slated for killing, perforin forms pores in the cell membrane of the target cell through which the granzymes and associated molecules can enter, inducing apoptosis (e.g., cell death).

The NK-92® cell line is a unique cell line that was discovered to proliferate in the presence of interleukin 2 (IL-2). Gong et al., *Leukemia* 8:652-658 (1994). These cells have high cytolytic activity against a variety of cancers. The NTK92® cell line is a homogeneous cancerous NK cell population having broad anti-tumor cytotoxicity with predictable yield after expansion. NK-92® was discovered in the blood of a subject suffering from a non-Hodgkins lymphoma and then immortalized ex vivo. NK-92® cells are derived from NK cells, but lack the major inhibitory receptors that are displayed by normal NK cells, while retaining the majority of the activating receptors. NK-92® cells do not, however, attack normal cells nor do they elicit an unacceptable immune rejection response in humans. Characterization of the NK-92® cell line is disclosed in PCT WO 1998/49268 and U.S. Patent Application Publication No. 2002/0068044.

[For purposes of this invention and unless indicated otherwise, the term "NK-92®" or "NK90®" is intended to refer to the original NK-92® cell lines as well as NK-92® cell lines, clones of NK-92® cells, and NK-92® cells that have been modified (e.g., by introduction of exogenous genes). NK-92® cells and exemplary and non-limiting modifications thereof are described in U.S. Pat. Nos. 7,618,817; 8,034,332; 8,313,943; 9,181,322; 9,150,636; and published U.S. application Ser. No. 10/008,955, all of which are incorporated herein by reference in their entireties, and include wild type NK-92®, NK-92®-CD16, NK-92®-CD16-γ, NK-92®-CD16-ζ, NK-92®-CD16(F176V), NK-92®MI, and NK-92®CI. NK-92® cells are known to persons of ordinary skill in the art, to whom such cells are readily available from NantKwest, Inc.

As used herein, the term "aNK™ cells" refers to the parental NK-92® cells. aNKT™ cells depends on IL-2 for growth.

As used herein, the term "haNK® cells" refers to NK-92® cells that have been engineered to express Fc receptor.

As used herein, the term "taNK® cells" refers to NK-92® cells that have been engineered to express a chimeric antigen receptor (CAR) with affinity for a cancer specific antigen, a cancer associated antigen, or a tumor specific antigen. In some embodiments, the tumor specific antigen is HER-2, e.g., human HER-2, and these NK-92® cells are referred to as HER-2 taNK® cells.

As used herein, the term "t-haNK® cells" refers to NK-92® cells that have been engineered to express an Fc receptor and a chimeric antigen receptor (CAR) with affinity for a cancer specific antigen, a cancer associated antigen, or a tumor specific antigen. For example, the tumor specific antigen is CD19, and these NK-92® cells are referred to as CD19 t-haNK® cells.

Harnessing the unique power of our immune system using natural killer cells to treat cancer, infectious diseases and inflammatory diseases offers many advantages over other therapies. Natural killer cells are the body's first line of defense due to the innate ability of these cells to rapidly identify and destroy cells under stress, such as cancer or virally-infected cells.

The capacity to grow active killer cells as a biological cancer therapy designed to induce apoptosis in cancerous cells or infected cells employs three different modes of action: 1) aNK cells are a unique variant of natural killer cells (e.g., NK-92®) that lack inhibitory receptors but have a broad array of activating receptors. Direct killing uses aNK cells to release toxic granules directly into the cancer cell through cell-to-cell contact; 2) haNK® cells are another variant of NK-92® cells that are engineered to incorporate a high affinity receptor that binds to an administered antibody to enhance the cancer cell killing effect of that antibody; and 3) t-haNK® cells are target activated natural killer cells engineered to incorporate chimeric antigen receptors (CARs) to target tumor-specific antigens found on the surface of cancer cells.

The aNK, haNK® and t-haNK® cell platforms addresses certain limitations of T-cell therapies including the reduction of risk of serious "cytokine storms." As an "off-the-shelf" therapy, these natural killer cells do not rely on a patient's own, often compromised; immune system. However, growing cells, for example, NK, aNK, haNK® and/or t-haNK® cells, on a commercial scale for wide-spread therapeutic use offers some unique challenges including adding efficiency to the overall process and optimizing the yield of cell product.

Centrifugation concentrates a large volume of cells produced from the bioreactors into a concentrated volume and cell density (FIG. 1). When cells pass through the continuous centrifuge system, for example, the majority of cells are retained in the centrifuge disposable chamber pods as a cell bed while a minority fraction of cells are diverted to the permeate waste. Cell loss using similar bioprocessing systems is also likely. Consequently, significant cell loss was observed in the overall process recovery. This is inefficient because formation of an effective cell bed is critical for a higher process recovery after concentration.

To prevent excess flow through of cells to the permeate waste at the beginning of the process, a recirculation loop is contemplated. The recirculation loop redirects cells back to the cell bag instead of going in a singular flow path into the waste bag. This is achieved by adding a sterile tubing assembly that includes a shaped tubing connector (i.e., barbed Y-connector or barbed T-connector with sterile tubing) that is sterile-welded to the permeate waste line as well as the cell bag containing the culture for continuous centrifuge processing. The tubing may be constructed of TPE tubing, i.e., C-Flex, BioFlex, AdvantaFlex or any other serializable TPE material known to those of skill in the art. This configuration of the recirculation loop connects the continuous centrifuge system permeate waste line with both the waste bag and the cell bag. Direction of flow for the Y-shaped connector is regulated to direct cells from the system into either the cell bag vessel or the waste bag as desired. The flow path may be controlled manually by clamping either tubing section to divert flow. It is contemplated that the flow path could also be automatically controlled. A sterile septum sampling port may also be included inline on this assembly so that permeate could be sampled and monitored for cell concentrations.

FIGS. 4-7 illustrate some embodiments of the methods and systems disclosed herein. In this application, cells or other particles are concentrated, a media and/or buffer exchange may occur, and then cells are transferred from the rotating chamber 5 by recirculating cells to facilitate enhanced cell accumulation in the pod for an efficient cell bed formation without losing an initial volume of cells to the waste. This is done without reversing the directional flow of initial media via one or more pumps from cell bag 1, or new media and/or wash buffer.

Figure 2:
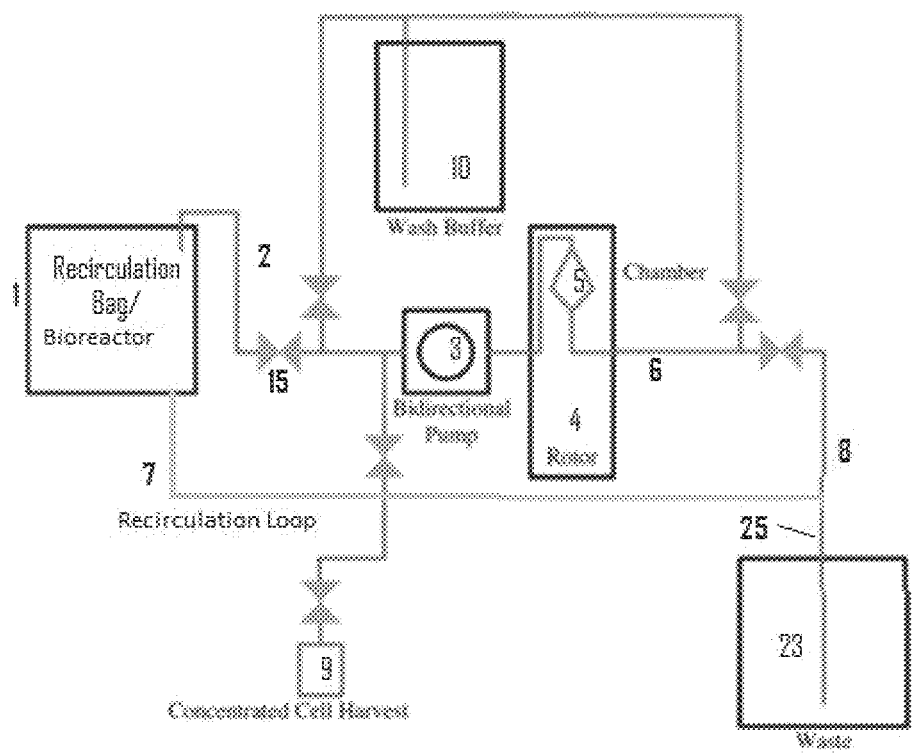
FIG. 2 is a schematic diagram of an exemplary method and continuous centrifugation system including a recirculation loop according to embodiments of the present invention.
Figure 3:
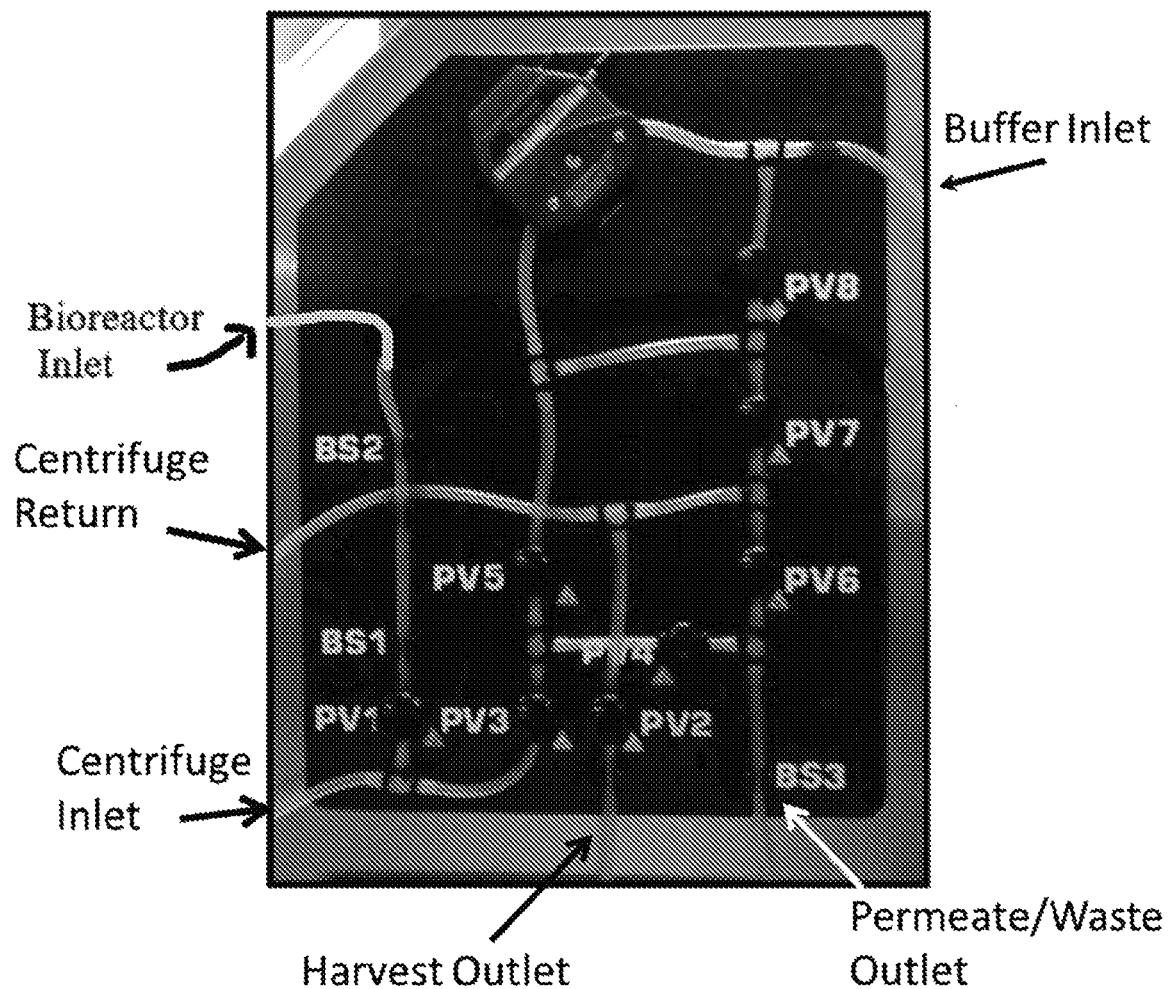
FIG. 3 is a schematic diagram of a valve set and fluid flow pathways including a recirculation loop according to certain embodiments of the present invention.

FIG. 2 shows a simplified diagram of an example of a flow pathway of media and cells out of cell bag 1 (i.e., the harvest vessel used for recirculation), via pathway 2, through open valve 15 and through a pump 3, to a centrifuge apparatus 4 comprising a rotating internal centrifugal chamber 5. The location and number of valves shown in FIG. 2 are for exemplary purposes only. Alternative valve locations along flow pathways are, of course, possible without changing the spirit and/or the advantages of the recirculation loop configuration. For example, see preferentially-placed valves PV1-PV8 in FIG. 3. One or more bubble sensors BS1-BS3 may be optionally placed at critical location(s) along the flow pathways. One example is shown in FIG. 3. Pump 3 in FIG. 2 is bi-directional where in it pumps culture into the centrifuge as well as pumps harvest materials out at the end of process. The majority of cells are retained in the rotating chamber 5 of the centrifuge while the permeate waste and some cells flow out of centrifuge apparatus 4 via pathway 6 through a valve configuration (FIG. 3) to the waste line/recirculation loop 7 back to recirculation bag 1. The elegant addition and configuration of the recirculation loop 7, in particular, has many advantages as further described below.

Figure 4:
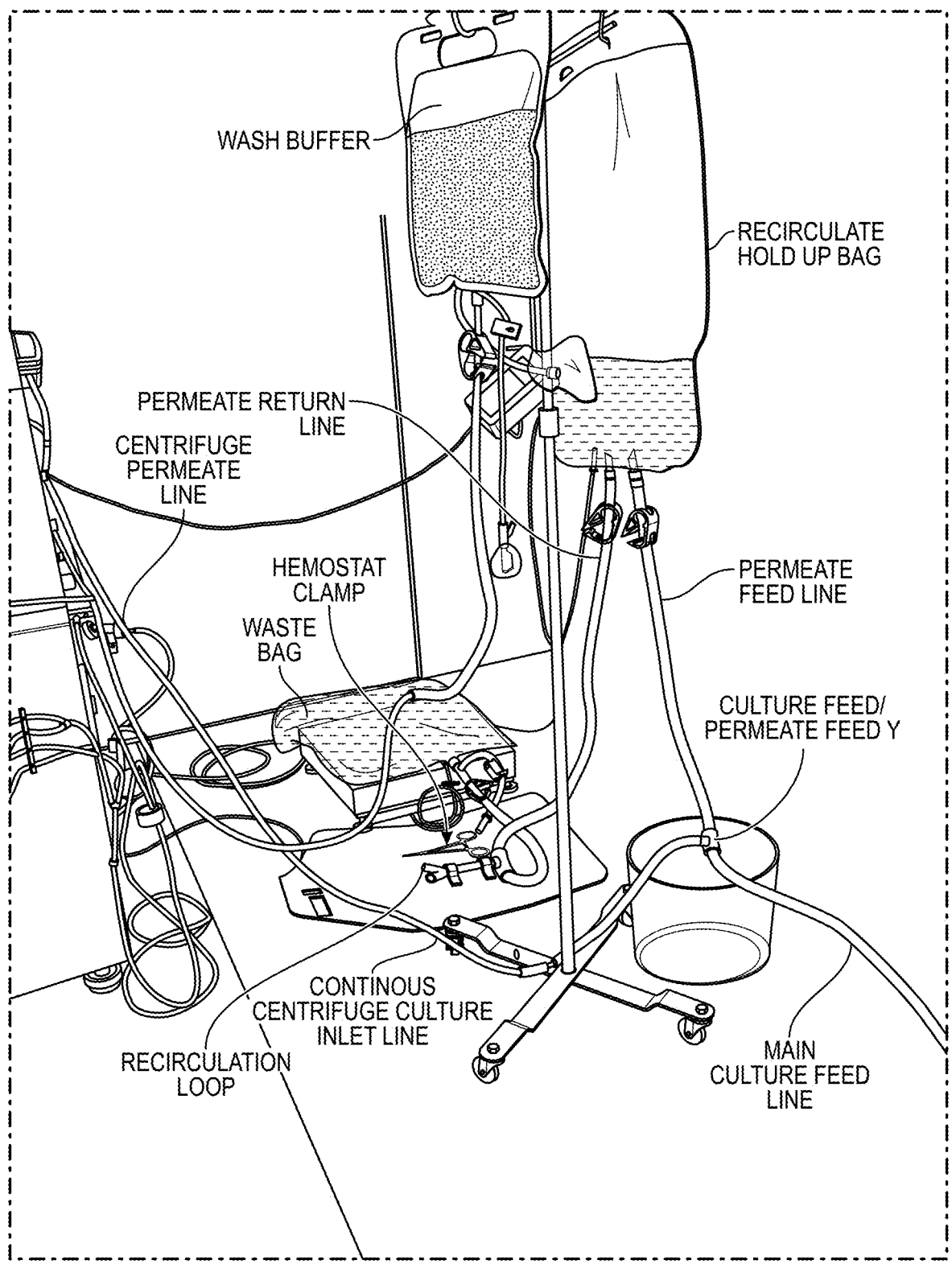
FIG. 4 contains photographs of exemplary systems including a recirculation loop according to embodiments of the present invention.
Figure 6:
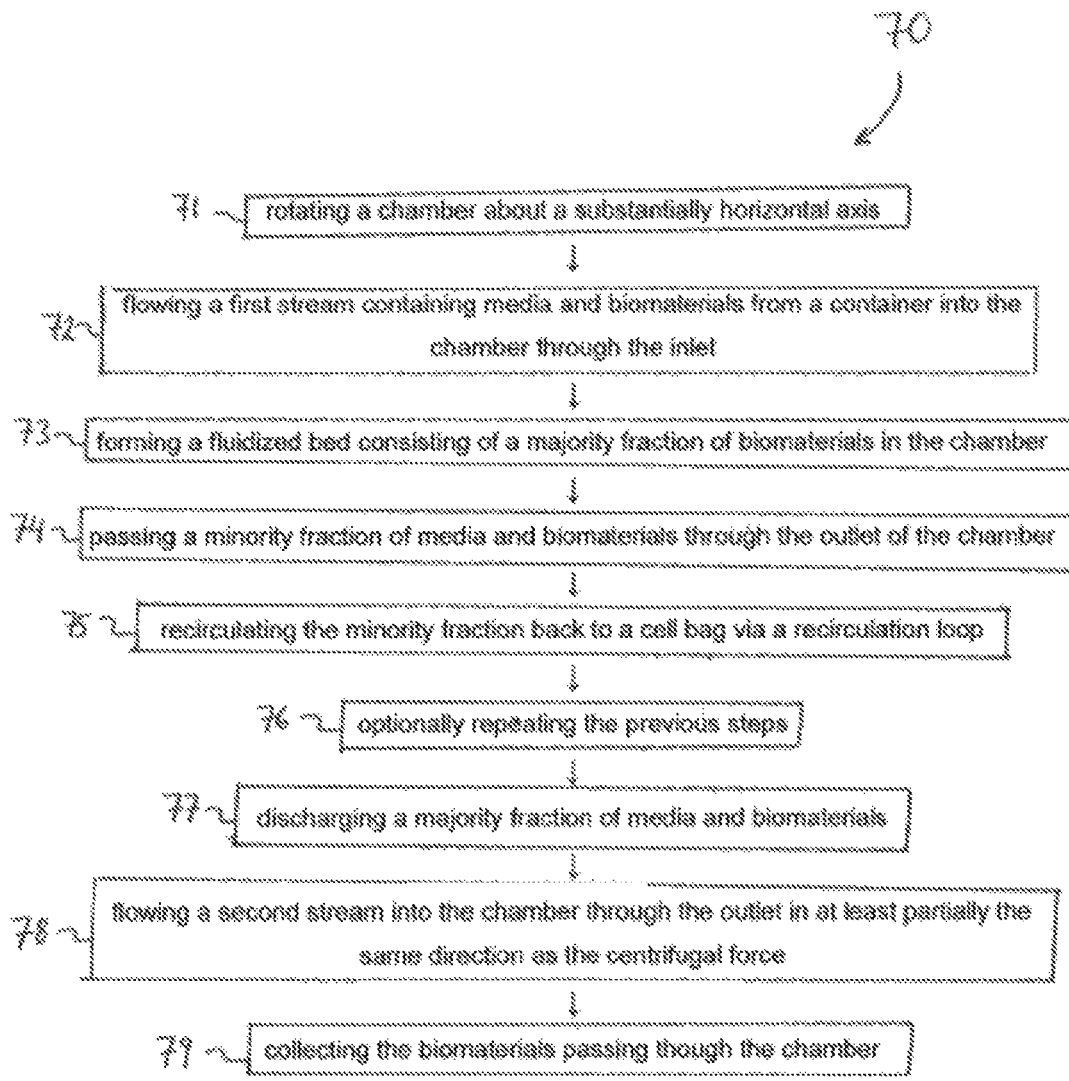
FIG. 6 is a flowchart for a method of increasing yields of biomaterials according to embodiments of the present invention.

Valve 8 may be a Y-valve (or T-valve) to prevent excess flow through of cells to the permeate waste (i.e., waste collection vessel) 23 at this stage of the process. The recirculation loop 7 redirects cells back to recirculation bag/bioreactor 1 (e.g., WAVE Cellbag, Stirred-tank Bioreactor, Labtainer™) instead of going into the waste bag 23. This is achieved by adding a sterile tubing assembly that includes ¼"×⅜" and ⅜"×⅝" C-Flex tubing with a Y-shaped connector valves that are sterile-welded onto the permeate waste line 6 as well as the waste bag and recirculation bag (FIG. 6). This configuration of the recirculation loop 7 connects the continuous centrifuge permeate waste line 6 with the waste bag 23 and recirculation bag/bioreactor 1. Direction of flow for the Y-shaped connector is regulated to direct cells from the system into either the recirculation bag/bioreactor 1 or the waste bag 23 as desired. A hemostat or common tubing clamp, as seen in FIG. 4, may be used to close off the pathway to the waste line when it is not being used (FIG. 4) or, alternatively, to divert waste to the waste bag 23 instead of recirculation bag/bioreactor 1 after one or more recirculation cycles are completed. A sterile septum sampling port (FIG. 6) may also be optionally included inline on this assembly so that permeate can be conveniently sampled and monitored for cell concentrations during concentration and further processing as desired.

No cells are harvested into the final harvest vessel 9 during the concentration phase. Cells are only harvested into the final harvest vessel 9 at the end of processing. During processing, the dead cells and culture debris are washed out and into the permeate which is then directed out of centrifuge and into the waste. This recirculation process takes between about 30-45 minutes to establish a cell bed. Once the cell bed is established, the Y-arm that leads permeate to the recirculation loop is clamped off and all permeate is then diverted to waste. At this stage, concentration begins. When the desired culture volume is processed and operator either stops the feed to the centrifuge or the holding vessel empties, the wash step automatically initiates and rinses the cell bed into the wash buffer via a desired number of buffer exchanges determined by pod volumes. The process completes with the harvest of the washed, buffer exchanged concentrated cell bed pumped out of the centrifuge chamber 5 via pump 3 into the final harvest vessel 9 in a pre-determined volume for desired cell density. The recirculation loop itself plays no role in what happens inside the centrifuge; however, it allows an easy and convenient way to monitor and reprocess what is lost during the initial cellbed formation when the fluidized flow force and centrifugal force haven't built up enough critical mass to hold cells in the chambers.

FIG. 4 shows a photograph of the recirculation system configured for use. In this example, the centrifuge permeate line is connected by a series of sterile tubing to a rotating internal chamber with 4 pods. The cell permeate and debris is pumped out of the chambers via fluid flow dynamics (FIG. 1) and centrifugal force and into the permeate line where it is then re-directed from the waste flow path to the Recirculate bag via tubing clamp (hemostat or equivalent). The Recirculate hold up vessel is allowed to build a partial volume of permeate and then the Permeate Feed line is opened and the system feeds in uniformly with fresh culture being pulled by pumps connected to various pathways generally described and shown in HG. 3 via tubing lines and pneumatically controlled valves, for example.

Figure 5:
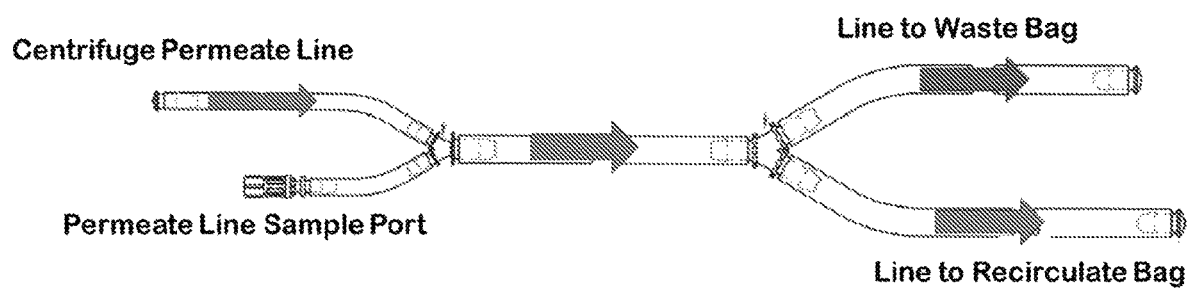
FIG. 5 shows an exemplary configuration of the tubings and fluid flow in the recirculation loop in the continuous centrifugation system according to embodiments of the present invention.

FIG. 5 shows an exemplary schematic of the tubing configuration and the fluid flow when employing the recirculation loop with a continuous centrifuge. The tubing clamp would be placed as desired on either the line to the waste bag or the recirculation as dictated by process parameters.

Applicants have used a continuous centrifuge for the concentration, wash and harvest of NK cells (aNK, haNK®, taNK® and t-haNK® cells). During the initial concentration step, high cell loss resulted in overall poor recovery of cells at the end of the run (~50% on average). FIG. 8 shows the resulting data from multiple continuous centrifuge runs without using a recirculation loop configuration and without the use of the related methods and systems described herein.

A recirculation loop 7 from the waste line (e.g., pathway 25 in FIG. 2) to the WAVE Cellbag or similar collection vessel such as a Labtainer 1 (e.g., Labtainer FIGS. 4) was invented to drastically improve the continuous centrifuge system's process including harvesting NK, NK-92®, aNK, haNK®, taNK® and/or t-haNK® cells on a commercial scale for wide-spread therapeutic use. The recirculation loop configuration is depicted in FIG. 2, for example. During the recirculation, the cells were pumped back to the Labtainer I instead of the waste bag 23 which allowed the cell bed to build up inside the centrifuge pods 5 as well. This recirculation step has prevented cell loss before the concentration step has begun.

FIG. 6 summarizes steps to increase the yield of biomaterials 70. The method comprises rotating a chamber about a substantially horizontal axis 71. This creates a centrifugal force. The chamber includes and inlet and an outlet. A first stream, containing media and biomaterials, is flowed from a container into the chamber through the inlet 72. The flowing force of the first stream creates a force that opposes the centrifugal force. A fluidized bed consisting of a majority fraction of biomaterials in the chamber is at least partially formed by this action 73. Basically, the centrifugal force and the flowing force substantially immobilize the biomaterials in the fluidized bed by the summation of vector forces acting in the biomaterials. A minority fraction of media and biomaterials is then passed through the outlet of the chamber 74. The minority fraction is recirculated back to a cell bag through a recirculation loop 75. The preceding steps may be optionally repeated as many times as desired although a single pass through the recirculation loop 75 is usually sufficient to optimize cell yields. A majority fraction of media and biomaterials are discharged from the fluidized bed 77. A second stream is flowed into the chamber through the outlet to create a second flowing force in at least partially the same direction as the centrifugal force 78. The biomaterials passing though the chamber are then collected in the final harvest vessel 79.

Figure 7:
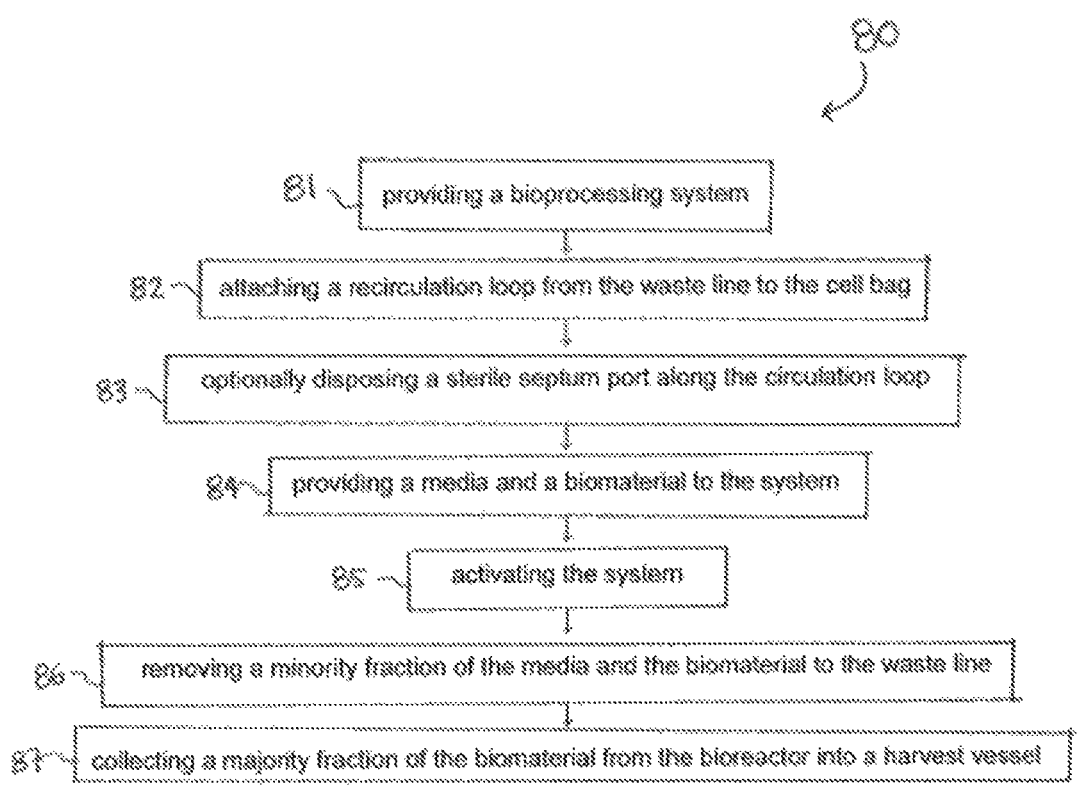
FIG. 7 is a flowchart for a method for enhancing fluidized bed formation according to embodiments of the present invention.

FIG. 7 summarizes the steps in a method to enhance a fluidized biomaterial bed formation 80. A bioprocessing system is first provided 81. A recirculation loop is attached from the waste line to the cell bag 82. A sterile septum port may be optionally disposed anywhere along the circulation loop 83 to conveniently allow a permeate to be sampled and monitored for biomaterial flow through titers. A media and a biomaterial are provided to the system 84. The biomaterial may be cells, organelles, or cell products, for example. The system is activated (i.e., powered on to operating mode) 85. A minority fraction of the media and the biomaterial are removed to the waste line after a selected run time 86. A majority fraction of the biomaterial is collected from the bioreactor into a harvest vessel after an additional selected run time 87.

The average of continuous centrifuge system processes recovery was 88.7% with the addition of the recirculation loop. FIG. 9 and FIG. 10 summarize experimental data resulting from continuous centrifuge system runs with the additional use of the recirculation loop configuration, methods and systems. It is anticipated that further refinements will increase the recovery beyond 90%. Such refinements may include reducing machine faults, lining pods up carefully and eliminating bent lines, for example.

Experiment number 10 in FIG. 8 indicates the first time where cells were pumped back to the Culture holding vessel after 4 L of cell culture was processed and found to be lost to waste. In this lot, the samples obtained from the waste bag had a relatively high cell density (i.e., 1e6 cells/mL). This is where the invention of the recirculation loop came to fruition. Overall, the continuous centrifuge system process recovery improved over 30% after the addition of the recirculation loop with average percent recovery in FIG. 8 (i.e., 50.4%) is compared with the average percent recovery in FIG. 9 and FIG. 10 (i.e., 88.7%).

Recirculation of cells facilitate enhanced cell accumulation in the pod for an efficient cell bed formation without losing an initial volume of cells that are required by this process. Viable cell density in the recirculation loop can be monitored periodically. For example, when the density reaches below $1 \times 10^5$ cells/mL, the recirculation loop is closed via hemostat, clamp, valve or similar structure known to those of skill in the art and the line to the waste bag 23 is opened to allow permeate to divert to waste.

Introduction of the recirculation loop has led to an unexpected and surprisingly high percent cell recovery from the continuous centrifuge system. As shown in FIG. 8, average recovery of the first nine runs using the continuous centrifuge system without the recirculation loop yielded only 50.4% recovery of cells. Nearly half of the cells were lost. Introduction of the recirculation loop yielded an average recovery of 88.7% from over fifty runs using a continuous centrifuge system as shown in FIG. 9 and FIG. 10. Some individual runs yielded over 100% recovery. The cells are the final product of this process so ensuring that they are intact and unaltered from their original state is very important. It is anticipated that similar results using other bioprocessing and/or centrifugation systems, such as the Unifuge by Pneumatic Scale Angelus, would yield similar results when configured with the recirculation loop and related embodiments described herewith. This improved recovery benefits clinical production since an increased number of infusion doses for patients will be produced from each harvest.

The previously described embodiments of the subject invention have many advantages, including: 1) enhanced cell bed formation; 2) reduced cell accumulation in waste during initial cell bed formation; and 3) increased overall cell production yields. Such embodiments provide new, useful and non-obvious methods and systems for enhanced bed formation and increased production yields during bioprocessing.

This disclosure includes the following exemplary embodiments:

Embodiment 1. A method for increasing yields of biomaterials, the method comprising: a) rotating a chamber about a substantially horizontal axis to create a centrifugal force, the chamber having an inlet and an outlet; b) flowing a first stream containing media and biomaterials from a container into the chamber through the inlet, wherein flowing the first stream acts to create a flowing force which opposes the centrifugal force; c) forming a fluidized bed consisting of a majority fraction of biomaterials in the chamber, wherein the centrifugal force and the flowing force substantially immobilize the biomaterials in the fluidized bed by the summation of vector forces acting on the biomaterials; d) passing a minority fraction of media and biomaterials through the outlet of the chamber; e) recirculating the minority fraction back to a cell bag via a recirculation loop; f) optionally repeating steps a) through e); then thereafter; g) discharging a majority fraction of media and biomaterials from the fluidized bed, wherein discharging comprises: h) flowing a second stream into the chamber through the outlet, wherein flowing the second stream acts to create a second flowing force at least partially in the same direction as the centrifugal force, and i) collecting the biomaterials passing though the inlet of the chamber.

Embodiment 2. The method of embodiment 1, wherein the container is a cell culture system or bioreactor.

Embodiment 3. The method of embodiment 1 or 2, wherein the biomaterials are cells, cellular organelles, nanoparticles, micro-particles, or cellular products.

Embodiment 4. The method of any of the preceding embodiments, wherein the cells are NK cells, aNK cells, haNK® cells, taNK® cells, t-haNK® cells or variants thereof.

Embodiment 5. The method of any of the preceding embodiments, wherein the cells are genetically engineered cells or modified cells.

Embodiment 6. The method of any of the preceding embodiments, wherein the cells are configured to treat cancer, infectious diseases, inflammatory diseases, or any combination thereof.

Embodiment 7. The method of any of the preceding embodiments, wherein the media is a buffer solution or a wash solution.

Embodiment 8. The method of embodiment 1, wherein recirculating increases a collection yield of the biomaterials passing though the inlet of the chamber by 25% to 32%.

Embodiment 9. The method of embodiment 8, wherein recirculating increases the collection yield of the biomaterials passing though the inlet of the chamber by about 30%.

Embodiment 10. The method of any of the preceding embodiments, wherein about 86% of the biomaterials passing though the inlet of the chamber are collected.

Embodiment 11. A method for enhancing fluidized biomaterial bed formation, the method comprising: providing a bioprocessing system, the system having a waste line, a cell bag and a bioreactor fluidly connected together; attaching a recirculation loop from the waste line to the cell bag, the recirculation loop having an sterile tube attached to a valve; providing a media and a biomaterial to the system; activating the system such that during at least an initial process, the media and biomaterials return to the bioreactor from the cell bag when the valve is in a first position; removing a minority fraction of the media and the biomaterial to the waste line when the valve is in a second position; and collecting a majority fraction of the biomaterial from the bioreactor into a harvest vessel.

Embodiment 12. The method of embodiment 11, wherein about 86% of the majority fraction of biomaterial is collected from the bioreactor into the harvest vessel.

Embodiment 13. The method of embodiment 11, further comprising: disposing a sterile septum port along the circulation loop, the port configured to allow a permeate to be sampled and monitored for biomaterial flow through titers.

Embodiment 14. The method of embodiment 13, wherein the minority fraction of media and biomaterial is removed to the waste line when the titers indicate a biomaterial density in the recirculation loop less than about $1 \times 10^5$ cells/mL.

Embodiment 15. The method of any of the embodiments 11-14, wherein the biomaterial is cells, cellular organelles, nanoparticles, micro-particles, or cellular products.

Embodiment 16. The method of any of the embodiments 11-15, wherein the cellular products are antibodies or antigens.

Embodiment 17. The method of embodiment 15, wherein the cells are NK cells, aNK cells, haNK® cells, taNK® cells, t-haNK® cells or variants thereof.

Embodiment 18. A system to enhance fluidized bed formation and increase production yields during bioprocessing, the system comprising: a chamber on a rotor that is rotatable about a substantially horizontal axis, in a plane substantially coaxial with the gravitational force axis, to create a centrifugal force, the chamber comprising an inlet and an outlet; a container containing a first media and particles, the container spaced apart from the rotor; at least one pump in fluid communication with the rotating chamber and the container; a manifold in fluid communication with the rotating chamber, wherein the manifold includes a plurality of spaced apart valves that are selectively closed and opened during use; a controller in communication with the at least one pump and the valves, wherein the controller directs: (i) the valves to open and close, (ii) the flow rates of the at least one pump, (iii) the rotational speed of the rotor, and (iv) a flow velocity of a first stream containing the first media and particles from the container into the chamber through the inlet, a recirculation tube having one end fluidly connected to a cell bag and an opposite end fluidly connected to a waste line, the recirculation tube having a loop valve disposed therein; wherein during operation, the flow velocity of the first stream from the container into the chamber through the inlet acts to create a force which opposes the centrifugal force, thereby forming a fluidized bed of particles in the chamber, wherein the forces substantially immobilize the particles in the fluidized bed by the summation of vector forces acting on the particles, and wherein the loop valve in a first position directs a minority fraction of the media and the particles from the chamber to the cell bag via the recirculation tube and back to the chamber, wherein the controller further directs a flow velocity of a second stream containing a second media into the chamber through the outlet, wherein during operation, the flow velocity of the second stream into the chamber through the outlet acts to create a force at least partially in the same direction as the centrifugal force field and the loop valve in a second position bypasses the recirculation loop to direct a minority fraction of the media to the waste line and a majority fraction of the particles from the fluidized bed to a final harvest vessel.

Embodiment 19. The system of embodiment 18, wherein the first media is a growth media and the second media is a wash buffer.

Embodiment 20. The system of embodiment 18-19, wherein the particles are biomaterials or inert materials.

Embodiment 21. The system of any of the embodiments 18-20, wherein the biomaterials are cells, cellular organelles, nanoparticles, micro-particles, or cellular products.

Embodiment 22. The system of any of the embodiments 18-21, wherein the cells are NK cells, aNK cells, haNK® cells, taNK® cells, t-haNK® cells or variants thereof.

Embodiment 23. The system of any of the embodiments 18-22, wherein the container is a cell culture system or bioreactor.

Embodiment 24. The system of any of the embodiments 18-23, further comprising: a sterile septum port disposed along the circulation tube, the port configured to allow contents to be sampled and monitored for particle flow through concentrations.

Embodiment 25. The system of embodiment 22, wherein the minority fraction of cells are moved to the waste line when the concentration indicates a cell density in the recirculation tube of less than about $1 \times 10^5$ cells/mL.

Embodiment 26. The method of any of the embodiments 11-17, wherein the bioprocessing system is a continuous centrifugation system.

Embodiment 27. The method of any of the embodiments 1-10, wherein the rotating the chamber is performed by continuous centrifugation.

Although embodiments of the invention have been described in considerable detail with reference to certain preferred versions thereof, other embodiments are possible. Therefore, the spirit and scope of the appended claims should not be limited to the descriptions of the embodiments above.

What is claimed is:

1. A method for enhancing fluidized biomaterial bed formation, the method comprising:
   providing a bioprocessing system, the system having a chamber having an inlet and an outlet, a bi-directional pump, a waste bag, a waste line, a recirculation bag/bioreactor, and a harvest vessel fluidly connected together; wherein (i) the waste line connects the waste bag and the chamber via the chamber outlet, and (ii) the bi-directional pump connects the recirculation bag/bioreactor and the harvest vessel to the chamber via the chamber inlet;
   attaching a recirculation loop from the waste line to the recirculation bag/bioreactor, the recirculation loop having a sterile tube attached to a valve;
   providing a media and a biomaterial to the system;
   activating the system such that during at least an initial process, the media and biomaterial in the chamber return to the recirculation bag/bioreactor when the valve is in a first position, thereby recirculating the media and biomaterial from the chamber back to the recirculation bag/bioreactor via the recirculation loop instead of the waste bag;
   removing a minority fraction of the media and the biomaterial from the chamber to the waste line when the valve is in a second position, thereby directing the minority fraction of the media and the biomaterial from the chamber into the waste bag instead of the recirculation bag/bioreactor;
   collecting a majority fraction of the biomaterial from the recirculation bag/bioreactor into the chamber via the bi-directional pump; and
   collecting the majority fraction of the biomaterial from the chamber into the harvest vessel via the bi-directional pump; and
   wherein the recirculation of media and biomaterial from the chamber back to the recirculation bag/bioreactor via the recirculation loop increases collection yield of the majority fraction of the biomaterial in the chamber by 25% to 32% as compared to a method without recirculation, and
   wherein about 86% of the majority fraction of biomaterial is collected into the harvest vessel.

2. The method of claim 1, further comprising:
   disposing a sterile septum port along the recirculation loop, the port configured to allow a permeate to be sampled and monitored for biomaterial flow through titers.

3. The method of claim 2, wherein the minority fraction of media and biomaterial is removed to the waste line when the titers indicate a biomaterial density in the recirculation loop of less than about $1 \times 10^5$ cells/mL.

4. The method of claim 1, wherein the biomaterial is cells, cellular organelles, nanoparticles, micro-particles, cellular products, antibodies or antigens.

5. The method of claim 4, wherein the cells are NK cells, aNK cells, NK cells engineered to express an Fc receptor, NK cells engineered to express a chimeric antigen receptor, NK cells engineered to express an Fc receptor and a chimeric antigen receptor or variants thereof.

6. The method of claim 1, wherein the bioprocessing system is a continuous centrifugation system.

* * * * *